United States Patent
Daugherty et al.

(10) Patent No.: US 7,201,181 B1
(45) Date of Patent: Apr. 10, 2007

(54) MIXING VALVE

(75) Inventors: James C. Daugherty, Three Rivers, MI (US); Lawrence J. Grubka, Vicksburg, MI (US); Darryl L. Watkins, Vicksburg, MI (US); Paul K. Holliday, Portage, MI (US)

(73) Assignee: Armstrong International, Inc., Three Rivers, MI (US)

( * ) Notice: Subject to any disclaimer, the term of this patent is extended or adjusted under 35 U.S.C. 154(b) by 291 days.

(21) Appl. No.: 11/006,129

(22) Filed: Dec. 7, 2004

(51) Int. Cl.
*G05D 11/16* (2006.01)
(52) U.S. Cl. .................... 137/100; 261/64.3
(58) Field of Classification Search ............. 137/100; 261/64.3
See application file for complete search history.

(56) References Cited

U.S. PATENT DOCUMENTS

| 2,335,250 | A | * | 11/1943 | Napier | 137/114 |
| 2,483,426 | A | * | 10/1949 | Moore | 261/64.3 |
| 3,938,554 | A | * | 2/1976 | Samuels | 137/625.61 |
| 4,354,425 | A | * | 10/1982 | Bruton et al. | 137/377 |
| 4,834,130 | A | | 5/1989 | North | |
| 6,076,809 | A | * | 6/2000 | Cummins et al. | 261/62 |

* cited by examiner

*Primary Examiner*—Stephen M. Hepperle
(74) *Attorney, Agent, or Firm*—MacMillan, Sobanski & Todd, LLC

(57) ABSTRACT

A mixing valve for mixing steam and water comprising an inlet chamber for steam, an inlet chamber for water, and a mixing chamber for mixing the steam and the water. The mixing chamber has at least one outlet connected thereto. A valve member arranged in the steam inlet chamber is coupled to a diaphragm. The valve is responsive to pressure differentials in the water inlet chamber, and is utilized to control steam flow from the steam inlet chamber to the mixing chamber. The mixing valve includes an internal partition between the steam inlet chamber and the water inlet chamber. The internal partition includes a thermal break that minimizes the contact between the steam inlet chamber and the water inlet chamber, thus minimizing the heat transfer therebetween.

9 Claims, 5 Drawing Sheets

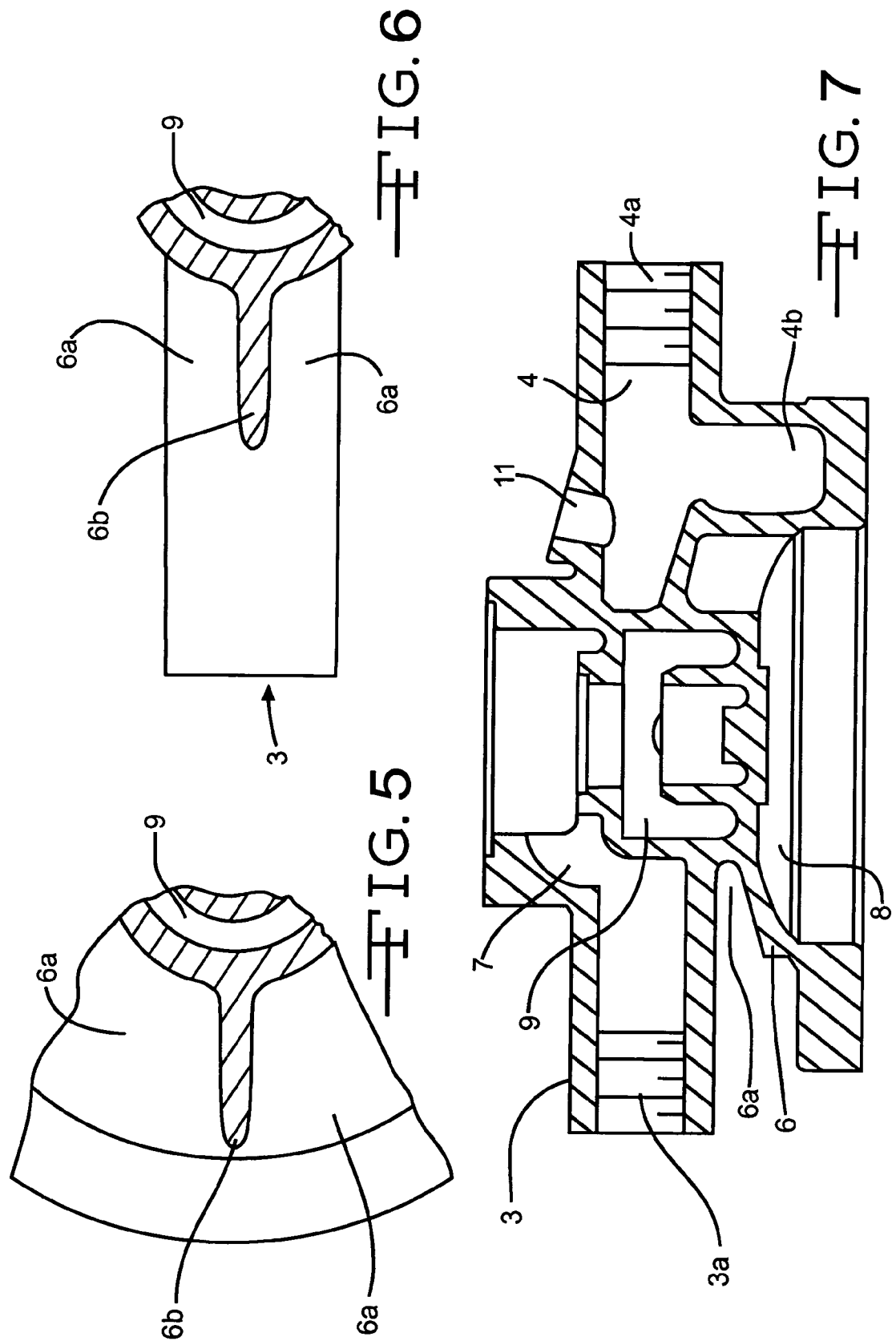

MIXING VALVE

TECHNICAL FIELD OF THE INVENTION

This invention relates to mixing valves and in particular to mixing valves for mixing steam and water.

BACKGROUND OF THE INVENTION

The blending of steam with cold water to provide a supply of hot water is commonly used in the food processing industry where there is a frequent need to wash equipment with hot water at a temperature sufficient to clean the equipment. Such food processing applications typically involve the use of a hot water hose gun that is supplied with hot water from a mixing valve. These hot water hose guns generally use a flow on/off trigger for starting and stopping a draw of hot water from the mixing valve and also include means for adjusting the spray pattern.

Thermostatic mixing valves are often used to provide the hot water supply to the hose gun. These mixing valves employ a proportioning valve responsive to the hot water temperature for controlling both the steam and the cold water flow so as to maintain the temperature of the hot water substantially constant. One disadvantage of these types of valves is the inability of known designs to completely shut-off steam flow when the water is turned off. The incomplete shut-off of steam can result in the next draw-off of hot water to start with a violent burst of steam, which can be dangerous. Additionally, known valves are noisy in operation due to the continuous succession of steam implosions that occur when the steam and cold water mixes together in an internal mixing chamber.

Attempts have been made in the prior art to overcome the disadvantages noted above. For example, U.S. Pat. No. 4,834,130 to North teaches a mixing valve that operates based upon pressure differentials within the valve body to minimize steam implosions and provide a complete shut-off of the steam supply. The disclosure of U.S. Pat. No. 4,834,130 is herein incorporated by reference in its entirety.

In addition to the disadvantages noted above, another disadvantage of known mixing valve configurations is premature wear on various components of the mixing valve. This wear occurs due to an excessive amount of heat transfer between the steam inlet portion of the valve and the flow mixing and control components of the valve. This heat transfer can lead to the premature deterioration of the flow mixing and/or control components of the valve, hence leading to both the disadvantages discussed above as well as the possibility of premature failure of the mixing valve.

It is an object of the present invention to provide a mixing valve for mixing steam and water which mitigates at least some of the disadvantages of thermostatic mixing valves discussed above.

SUMMARY OF THE INVENTION

The present invention relates to a mixing valve for mixing steam and water. The mixing valve comprises an inlet chamber for steam, an inlet chamber for water, and a mixing chamber for mixing the steam and the water. The mixing chamber has at least one outlet connected thereto. The mixing valve also includes a valve means that is responsive to water flow. The valve means is utilized to control steam flow from the steam inlet chamber to the mixing chamber. Preferably, the valve means comprises a valve member arranged in the steam inlet chamber that is coupled to a diaphragm that is responsive to pressure differentials arising in the water inlet chamber. A control chamber for moving the valve member relative to a valve seating is also provided. The mixing valve also includes an internal partition between the steam inlet chamber and the water inlet chamber. The internal partition includes a thermal break between the steam inlet chamber and the water inlet chamber. The purpose of the thermal break is to minimize the contact between the steam inlet chamber and the water inlet chamber, thus minimizing the heat transfer between the various regions of the mixing valve. A means for controlling the temperature of the mixed steam and water is also provided.

Various objects and advantages of this invention will become apparent to those skilled in the art from the following detailed description of the preferred embodiment, when read in light of the accompanying drawings.

BRIEF DESCRIPTION OF THE DRAWINGS

FIG. 5 is a section taken along line 5—5 of FIG. 3, illustrating the thermal break provided on the internal partition separating the steam inlet chamber and the water inlet chamber.

FIG. 6 is a section taken along line 6—6 of FIG. 4, also illustrating the thermal break provided on the internal partition separating the steam inlet chamber and the water inlet chamber.

FIG. 7 is a section taken along line 7—7 of FIG. 2, illustrating the structural framework of the body portion of the mixing valve, and specifically illustrating the thermal break provided on the internal partition of the mixing valve.

DETAILED DESCRIPTION OF THE PREFERRED EMBODIMENT

Figure 1:
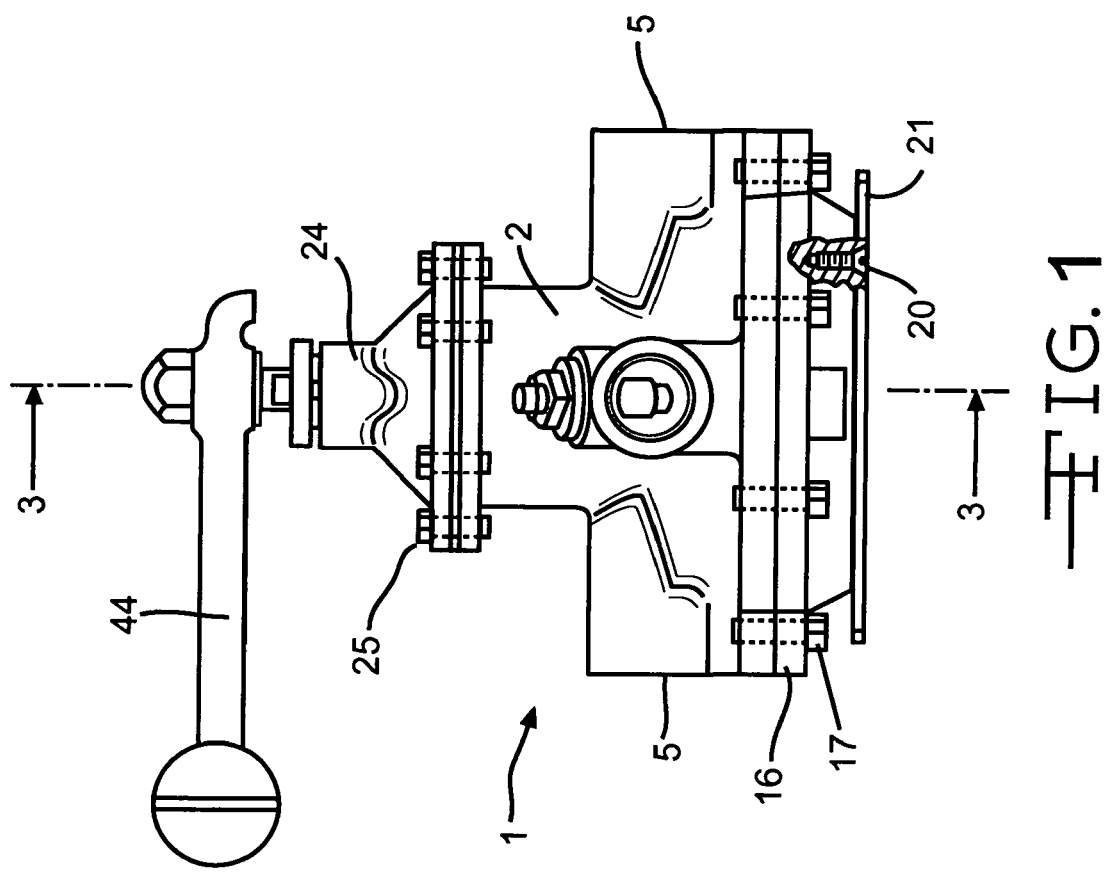
FIG. 1 is a side view of a mixing valve according to the present invention.
Figure 2:
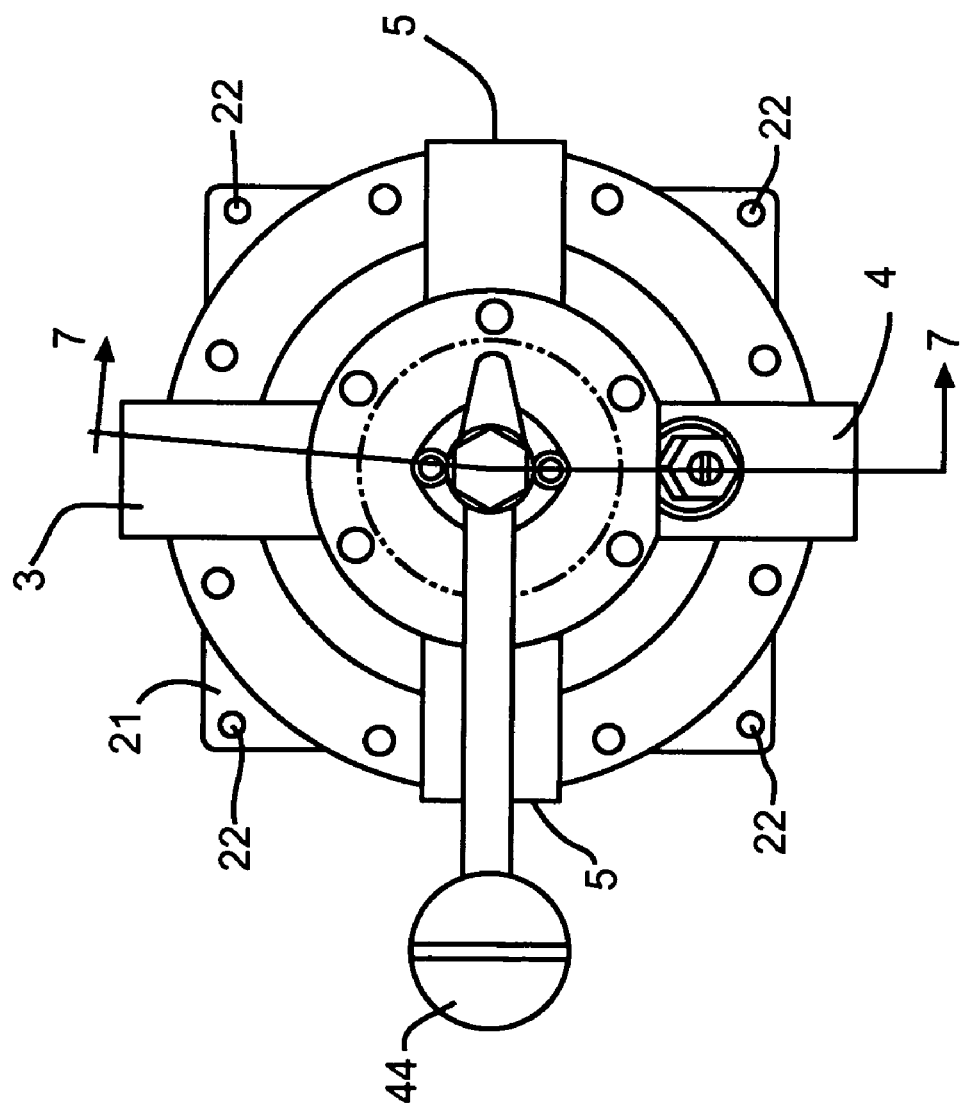
FIG. 2 is a plan view of the mixing valve shown in FIG. 1.

Referring now to the drawings, FIGS. 1 and 2 illustrate the external configuration of the mixing valve of the present invention. The mixing valve, indicated generally at 1, comprises a body 2 having a steam supply inlet 3 and a cold water supply inlet 4. The steam supply inlet 3 provides steam to a steam inlet chamber 7, while the cold water supply inlet 4 supplies cold water to a cold water inlet chamber 8. The steam inlet chamber 7 and the cold water inlet chamber 8 will be discussed in greater detail below.

Figure 3:
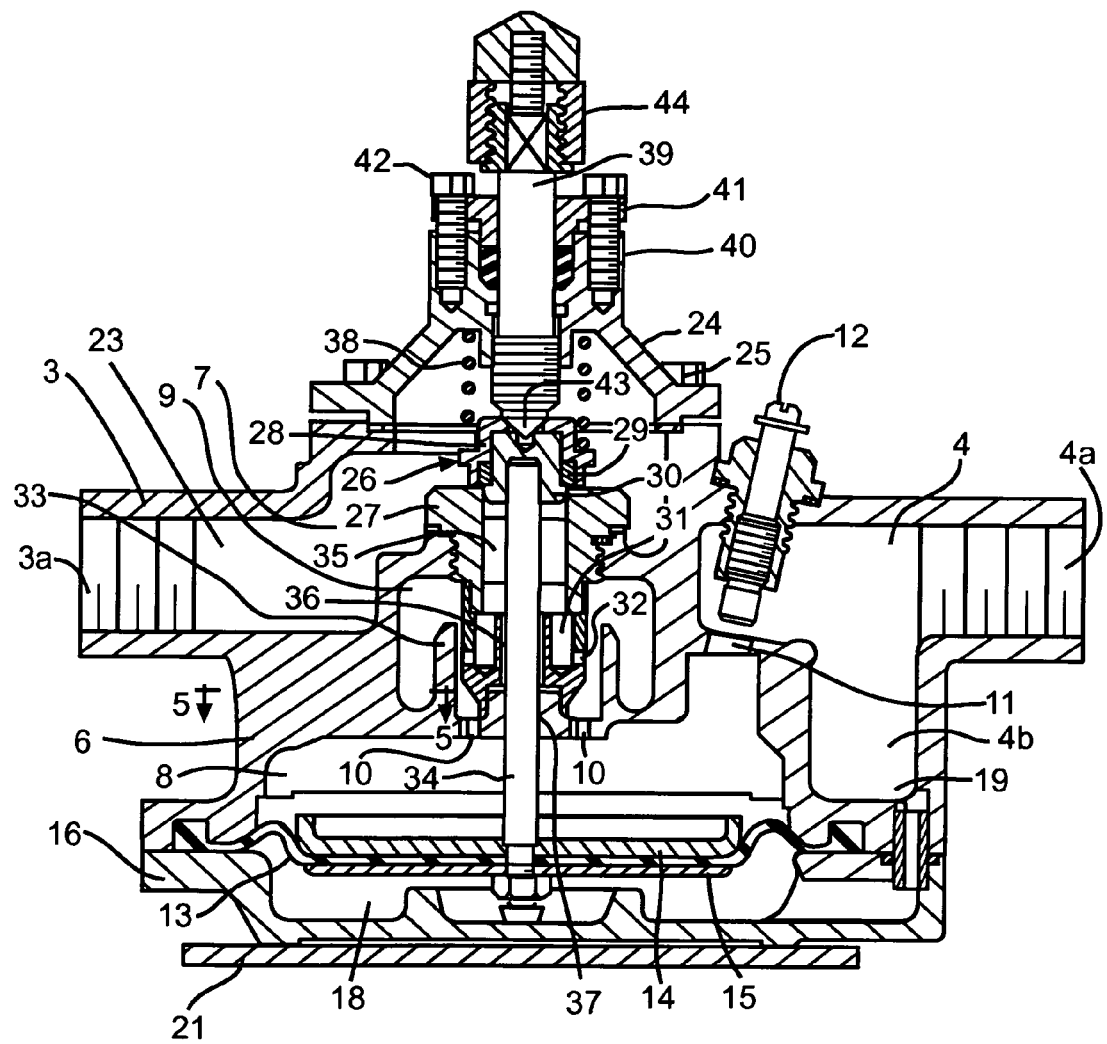
FIG. 3 is a section, to an enlarged scale, on the line 3—3 of FIG. 1, showing the steam valve closed.
Figure 4:
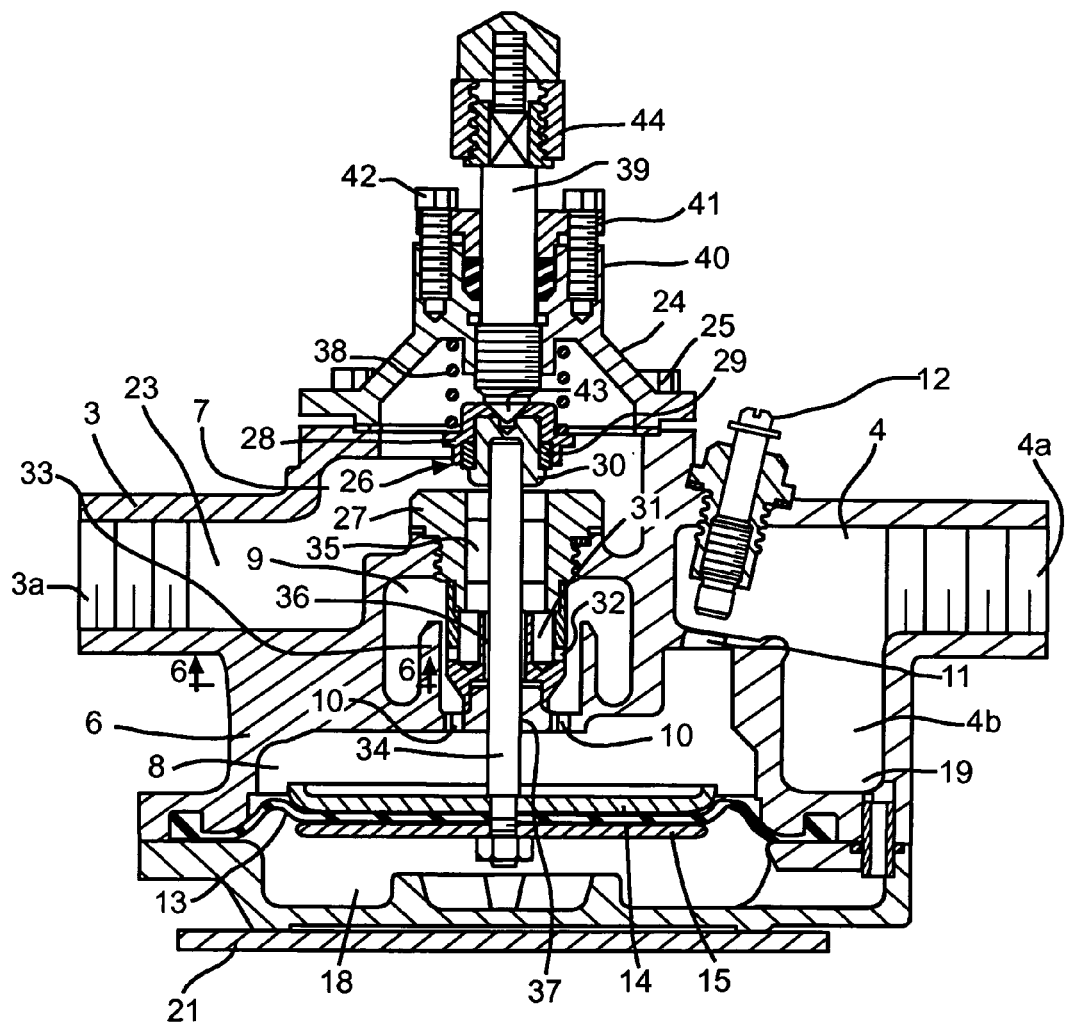
FIG. 4 is a section, similar to FIG. 3, showing the steam valve open.

The mixing valve 1 also contains at least one outlet 5 for connection of the mixing valve 1 to any suitable flow control device, such as a hose gun (not shown). In a preferred embodiment, the mixing valve contains two outlets 5 located on opposing sides of the mixing valve body 2 to allow connection of the flow control device to the mixing valve 1 from either side of the mixing valve body 2. It will be appreciated, however, that the mixing valve 1 may contain any suitable number of outlets 5 for connecting the mixing valve 1 to the flow control device as well. The steam supply inlet 3, the cold water supply inlet 4, and the outlet(s) 5 may be of any suitable size and shape for connecting the mixing valve 1 to the appropriate input/output device. Preferably, each of the inlets 3, 4 and the outlet(s) 5 are cylindrical in shape and contain a threaded portion at the outermost portion thereof. FIGS. 3 and 4 illustrate the threaded portion 3*a* of the steam supply inlet 3 and the threaded portion 4*a* of the supply inlet 4. The cold water inlet 4 may also include a reservoir 4*b* connected thereto for maintaining the proper level of cold water within the mixing valve 1.

FIGS. 3 and 4 best illustrate the internal components of the mixing valve 1. The body 2 of the mixing valve 1 is configured to define the various internal components of the mixing valve 1 such that the contact between the steam supply inlet 3 and steam inlet chamber 7 with the cold water inlet chamber 8 is minimized. The internal components of the mixing valve 1 may be configured in any suitable manner and using any suitable means that operates to minimize the contact between the steam inlet chamber 3 and steam inlet chamber 7 with the cold water inlet chamber 8. In the preferred embodiment, an internal partition 6 is used to separate the steam inlet chamber 7 from the water inlet chamber 8. The partition 6 is preferably a cast or forged metallic component, although it will be appreciated that the partition 6 can be formed from any suitable material and using any suitable manufacturing method. The partition 6 may be integrally formed with the body 2, or alternatively, may be formed separately and positioned within the body 2 accordingly. The partition 6 is designed both to provide structural integrity to the body 2, as well as to minimize the heat transfer from the steam supply inlet 3 and the steam inlet chamber 7 to other areas and components of the mixing valve 1. The specific structure of the partition 6 will be discussed in greater detail below.

The partition 6 also defines a mixing chamber 9. The mixing chamber 9 connects to the cold water inlet chamber 8 through a plurality of ports 10. The mixing chamber 9 also connects to the outlet(s) 5 to provide the mixed warm water to the coupled flow control device. The ports 10 provide a permanently open connection between the inlet chamber 8 and mixing chamber 9 through which water can flow at all times.

The steam supply inlet 3 is connected to the steam inlet chamber 7 by a passageway 23 in the body 2. The passageway 23 is defined by the internal partition 6 portion of the body 2, as well as by a bonnet housing 24 secured to the body 2 by threaded fasteners 25.

The flow of steam from the inlet chamber 7 to the mixing chamber 9 is controlled by a valve 26 arranged in the inlet chamber 7. The valve 26 moves axially relative to a valve seating member 27 to control the flow of steam entering the mixing chamber 9. The valve 26 is preferably a poppet type valve, however, it will be appreciated that any suitable valve capable of axial movement relative to the valve seating member 27 may also be used. In a preferred embodiment, the poppet valve 26 is comprised of a metal body 28 to which a resilient plastic seating ring 29 is secured by a metal plug 30 pressed into the body 28.

The seating member 27 can be made of any suitable material, and is preferably made of stainless steel. The seating member 27 opens to a diffuser 31 mounted within the mixing chamber 9. The diffuser 31 is provided with a plurality of radial ports 32 opening into the mixing chamber 9. The radial ports 32 are preferably disposed opposite an intermediate wall 33 within the mixing chamber 9. The intermediate wall 33 directs the cold water flow from the cold water inlet chamber 8 past the ports 32, which results in more efficient and quieter operation of the mixing valve 1. The operation of the mixing valve 1 will be discussed in greater detail below.

The cold water inlet 4 is connected to the cold water inlet chamber 8 by a port opening 11 in the body 2. The flow rate of cold water through the port 11 into the cold water inlet chamber 8 is controlled by a flow regulating means. Any suitable flow regulating means may be used. In the illustrated embodiment, an adjustable flow restrictor valve 12 is mounted in the cold water inlet 4 to regulate the flow of cold water between the cold water inlet 4 and the cold water inlet chamber 8.

The cold water inlet chamber 8 is defined in part by a rolling edge diaphragm 13. The diaphragm 13 is supported through its center portion by metal plates 14, 15 positioned on either side of the diaphragm 13. The diaphragm 13 can be made from any suitable steam resistant material, and is preferably made of a steam resistant fabric reinforced rubber or elastomer material. The diaphragm 13 is sealed to the body 2 by a base plate 16. The base plate 16 is then secured to the body 2 using threaded fasteners 17. As best shown in FIGS. 1 and 2, a square mounting plate 21 attaches to the base plate 16 by a plurality of screws 20. The mounting plate 21 includes a hole 22 at each corner. The mounting plate 21 is used for mounting the valve 1 by means of threaded fasteners (not shown).

The configuration of the diaphragm 13 relative to the base plate 16 defines a control chamber 18. The control chamber 18 communicates with the cold water inlet reservoir 4*b* through a passageway 19 opening into the inlet reservoir 4*b* upstream of the flow restrictor valve 12. This passageway 19 provides a fluid communication channel for incoming cold water to flow from the cold water inlet 4 through the reservoir 4*b* and into the control chamber 18. The cold water entering the control chamber 18 is of a certain pressure, and it is the differential between the pressure of the water in the control chamber 18 and the cold water inlet chamber 8 that operates the mixing valve 1. The operation of the mixing valve 1 will be discussed in greater detail below.

The poppet valve 26 controlling the steam flow from the steam inlet chamber 7 is coupled to the diaphragm 13 by a push rod 34. The push rod 34 is arranged such that the push rod 34 slides axially through a guide support 35 in the seating member 27. The arrangement of the push rod 34 also enables sliding axial movement of the push rod 34 relative to a central bore 36 in the diffuser 31 as well as a guide hole 37 in the partition 6.

One common problem associated with the prior art mixing valves is the deterioration of the diaphragm portion of the valve. The diaphragm, although generally constructed from steam resistant material, degrades due to the exposure to heat, which can cause the diaphragm to become brittle and lead to premature wear and/or failure of the diaphragm. The heat exposure to the diaphragm results from the transfer of heat from the steam inlet and steam inlet chamber across the internal metallic components of the mixing valve (e.g. the internal partition). The internal partition 6 of the present invention provides a particular advantage over the prior art designs in that the partition 6 includes a thermal break 6*a* formed therein. The thermal break 6*a* is oriented and designed to minimize the heat transfer from the steam supply inlet 3 and the steam inlet chamber 7 to the cold water inlet chamber 8 and the diaphragm 13. The structure of the partition will be discussed in greater detail below.

FIGS. 5 through 7 illustrate the internal partition 6 of the present invention. As discussed above, the partition 6 is preferably a cast or forged metallic component, and is preferably integrally formed with the body 2. The partition 6 separates the water inlet chamber 8 from the steam supply inlet 3 and from the steam inlet chamber 7. The partition 6 also defines a portion of the outer wall of the mixing chamber 9. The partition 6 includes a thermal break 6*a* that separates the steam supply inlet 3 and the steam inlet chamber 7 from the cold water inlet chamber 8. The thermal break 6a is preferably a void or open space formed within the internal partition 6 that provides an air space to separate the steam supply inlet 3 and steam inlet chamber 7 from the cold water inlet chamber 8. Alternatively, the thermal break 6a may also be comprised of a separate thermally non-conductive material, such as a ceramic material, disposed between the steam supply inlet 3, steam inlet chamber 7, and the cold water inlet chamber 8. In the preferred embodiment, the thermal break 6a is an open space formed by the configuration of the internal partition 6. The thermal break 6a is preferably located at a portion of the inner circumference of the body 2 that spans underneath the steam supply inlet 3. The thermal break 6a can be of any suitable size and shape. Preferably, the thermal break 6a is sized to span the area underneath the steam supply inlet 3. Positioning the thermal break 6a in this manner creates an air gap spanning underneath substantially the entire outer diameter of the steam supply inlet 3. It will be appreciated, however, that the thermal break 6a can extend about any portion of the inner circumference of the body 2 as well.

A narrow, casting ligament 6b may be included within the open space of the thermal break 6a. The purpose of the casting ligament 6b is to provide support to the steam supply inlet 3. The casting ligament 6b is preferably a rigid support member that is integrally formed into the internal partition 6. It will be appreciated, however, that the casting ligament 6b may be formed separately from the internal partition as well. The casting ligament 6b is preferably formed to extend radially outward from the portion of the internal partition 6 defining the mixing chamber 9 and to extend into the open space of the thermal break 6a. The casting ligament 6b is preferably disposed within the thermal break 6a such that the casting ligament 6b extends radially outward along a radius that falls along the centerline of the steam supply inlet 3. It will be appreciated, however, that the casting ligament 6b can be disposed at any suitable location within the open space of the thermal break 6a to support the steam supply inlet 3. The casting ligament 6b can be of any size and shape suitable to support the steam supply inlet 3. The length of the casting ligament 6b may extend across any suitable portion of the width of the thermal break 6a. Alternatively, the length of the casting ligament 6b may also be substantially equal to the width of the thermal break 6a, as is illustrated in FIGS. 5 and 6. The width, or material thickness, of the casting ligament 6b is preferably minimized so as to prevent any significant heat transfer through the casting ligament 6b. The width of the casting ligament 6b may also vary along the length of the casting ligament 6b, with the end of the casting ligament 6b disposed closest to the mixing chamber 9 having a greater material thickness than the opposite end of the casting ligament 6b. It will be appreciated, however that the casting ligament 6b may also have a uniform width along its entire length.

By positioning the thermal break 6a under the steam supply inlet 3, the amount of conductive material forming the partition 6 is minimized between the steam inlet chamber 7 and the cold water inlet chamber 8. This minimizes the amount of heat transfer between the steam inlet chamber 7 and the cold water inlet chamber 8. Consequently, this minimizes the heat exposure to the diaphragm 13, which in part defines the cold water inlet chamber 8. It will also be appreciated that the thermal break 6a may be of any other suitable size, shape, and/or material to sufficiently minimize the heat transfer between the inlet chambers 7, 8, as discussed above.

During operation of the mixing valve 1, the diaphragm 13 is subjected to the water pressures of the water in the inlet chamber 8 on one side of the diaphragm 13 and the control chamber 18 on the opposing side of the diaphragm 13. When there is no water flow through the valve 1, the water pressures on either side of the diaphragm 13 are balanced. When the water pressures are balanced, the poppet valve 26 engages the seating member 27 under the biasing of a return spring 38. The return spring 38, assisted by the hydrostatic steam pressure in the steam inlet chamber 7, shuts off the steam flow to the mixing chamber. FIG. 3 illustrates the closed position of the poppet valve 26. When the poppet valve 26 is in the closed position, the push rod 34 moves axially such that the base plate 15 surrounding the diaphragm 13 approaches the base plate 16.

As water flows into the water inlet chamber 4, water enters into the water inlet chamber 8 and into the mixing chamber 9 via the ports 10 connecting the water inlet chamber 8 and the mixing chamber 9. As water flows across the flow restrictor valve 12, a pressure drop occurs across the flow restrictor valve 12. This causes the upstream and downstream pressures (relative to the flow restrictor valve 12) to be transmitted to the control chamber 18 and the inlet chamber 8, respectively. The upstream water pressure is determined when the water entering the water inlet 4 flows into the water reservoir 4b and through the passageway 19 into the control chamber 18. The downstream water pressure results from the flow of the water across the flow restrictor valve 12 and into the cold water inlet chamber 8. The difference between the two pressures (upstream and downstream or the pressure in the control chamber 18 and the cold water inlet chamber 8, respectively) gives rise to a pressure differential across the diaphragm 13. This pressure differential increases with an increase in the flow across the flow restrictor valve 12. The increased pressure differential generates a force that urges the push rod 34 and the diaphragm 13 connected thereto in a direction so as to open the poppet valve 26 against the biasing of the spring 38. The opening of the poppet valve 26 then allows steam to flow from the steam inlet chamber 7 into the mixing chamber 9 (via the steam ports 32 in the diffuser 31) and mix with the cold water in the mixing chamber 9, thus heating the water.

As previously discussed, the inclusion of the intermediate wall 33 in the diffuser 31 diverts the flow of cold water past the steam flow into the mixing chamber 9. By directing the cold water flow past the steam ports 32 (i.e. the steam flow), the steam entering the mixing chamber 9 is blended smoothly with the cold water and the volume of the mixing chamber 9 can be kept small. Additionally, the separation of the cold water and the steam prior to mixing results in quieter operation of the valve because any noticeable succession of steam implosions is prevented by the separation.

To control the final temperature of the water, a temperature control spindle 39 is secured to the bonnet 24. The temperature control spindle 39 is preferably sealed by a gland 40, which is retained by a compression collar 41 and secured to the bonnet 24 by threaded fasteners 42. The inner end of the spindle 39 provides a stop 43 to limit the opening movement of the poppet valve 26. The inner end of the spindle 39 is axially adjustable between a first end position in which the poppet valve 26 is held closed and a second end position permitting maximum opening of the poppet valve 26 by a manually operable control handle 44 connected to the outer end. The flow restrictor valve 12 is adjusted on initial installation of the valve 1 with the stop 43 in the second end position to set the maximum water temperature.

This allows the user to select any desired temperature up to the maximum by appropriate adjustment of the stop 43.

A particular advantage of the mixing valve 1 is that the valve means for controlling the steam flow (i.e. the poppet valve 26) is responsive to cold water flow. This configuration results in the shutting off of the steam flow when the water flow into the mixing valve 1 is low or off. Further, the mixing valve 1 configuration provides that the valve is flushed with cold water on stopping the flow of steam. This filling of the mixing chamber 9 and control chamber 18 with cold water prevents the violent burst of steam that can occur when the flow is re-started.

Additionally, the poppet valve 26 configuration prevents the escape of steam and/or back-flow into the cold water supply. In the event that the cold water supply fails, the steam flow is immediately shut-off by the poppet valve 26. Similarly, the poppet valve 26 prevents back-flow of cold water into the steam supply. This feature provides a particular advantage in that is not necessary to equip the mixing valve with non-return valves in the steam and cold water supplies to prevent the escape of steam and/or backflow. While such non-return valves are not required in light of the configuration of the valve 1 of the present invention, it is generally preferable to include such non-return valves as a fail-safe in the event of a failure of the poppet valve 26.

The principle and mode of operation of this invention have been described in its preferred embodiments. However, it should be noted that this invention may be practiced otherwise than as specifically illustrated and described without departing from its scope.

What is claimed is:

1. A mixing valve for mixing steam and water comprising:
   an inlet chamber for steam;
   an inlet chamber for water;
   a mixing chamber for mixing steam and water;
   at least one outlet connected to the mixing chamber;
   an internal partition between the steam inlet chamber and the water inlet chamber, wherein the internal partition includes a thermal break between the steam inlet chamber and the water inlet chamber for minimizing the heat transfer therebetween;
   valve means responsive to water flow for controlling steam flow from the steam inlet chamber to the mixing chamber, the valve means comprising a valve member arranged in the steam inlet chamber and coupled to a diaphragm responsive to pressure differentials arising in the water inlet chamber; and
   a control chamber for moving the valve member relative to a valve seating.

2. A mixing valve according to claim 1 wherein the thermal break comprises a ceramic material disposed between the steam inlet chamber and the water inlet chamber.

3. A mixing valve according to claim 1 wherein the thermal break comprises an open space formed by the internal partition that is disposed between the steam inlet chamber and the water inlet chamber.

4. The mixing valve of claim 3 wherein the thermal break includes a casting ligament disposed therein.

5. The mixing valve of claim 4 wherein the casting ligament comprises a rigid support member that is disposed within the thermal break so as to support the steam inlet chamber.

6. A mixing valve for mixing steam and water comprising:
   an inlet chamber for steam;
   an inlet chamber for water;
   a mixing chamber for mixing steam and water;
   an internal partition between the steam inlet chamber and the water inlet chamber, wherein the internal partition includes a thermal break, the thermal break comprising an open space formed by the internal partition having a casting ligament disposed therein, and wherein the thermal break is disposed between the steam inlet chamber and the water inlet chamber so as to minimize the heat transfer therebetween;
   valve means responsive to water flow for controlling steam flow from the steam inlet chamber to the mixing chamber, the valve means comprising a valve member arranged in the steam inlet chamber and coupled to a diaphragm responsive to pressure differentials arising in the water inlet chamber;
   a control chamber for moving the valve member relative to a valve seating in the partition; and
   at least one outlet connected to the mixing chamber.

7. The mixing valve of claim 6 wherein the casting ligament comprises a rigid support member that is disposed within the thermal break so as to support the steam inlet chamber.

8. A mixing valve for mixing steam and water comprising:
   an inlet chamber for steam;
   an inlet chamber for water;
   a mixing chamber for mixing steam and water;
   a permanently open fluid connection between the water inlet chamber and the mixing chamber;
   an internal partition between the steam inlet chamber and the water inlet chamber, wherein the internal partition includes a thermal break, the thermal break comprising an open space formed by the internal partition having a casting ligament disposed therein, and wherein the thermal break is disposed between the steam inlet chamber and the water inlet chamber so as to minimize the heat transfer therebetween;
   valve means responsive to water flow for controlling steam flow from the steam inlet chamber to the mixing chamber, the valve means comprising a valve member arranged in the steam inlet chamber and coupled to a diaphragm responsive to pressure differentials arising in the water inlet chamber;
   a control chamber for moving the valve member relative to a valve seating in the partition; and
   at least one outlet connected to the mixing chamber.

9. The mixing valve of claim 8 wherein the casting ligament comprises a rigid support member that is disposed within the thermal break so as to support the steam inlet chamber.

* * * * *